US011610411B2

(12) United States Patent
Pfeifle (10) Patent No.: US 11,610,411 B2
(45) Date of Patent: Mar. 21, 2023

(54) DRIVER ASSISTANCE SYSTEM AND METHOD FOR DISPLAYING TRAFFIC INFORMATION

(71) Applicant: Visteon Global Technologies, Inc., Van Buren Township, MI (US)

(72) Inventor: Martin Pfeifle, Seewald (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 622 days.

(21) Appl. No.: 16/577,409

(22) Filed: Sep. 20, 2019

(65) Prior Publication Data

US 2020/0110948 A1 Apr. 9, 2020

(30) Foreign Application Priority Data

Sep. 21, 2018 (EP) ..................................... 18196064

(51) Int. Cl.
*G06K 9/00* (2022.01)
*G06T 17/05* (2011.01)
(Continued)

(52) U.S. Cl.
CPC ............ *G06V 20/584* (2022.01); *B60K 35/00* (2013.01); *B60R 1/00* (2013.01); *B60W 40/04* (2013.01);
(Continued)

(58) Field of Classification Search
CPC ................. G06V 20/584; B60K 35/00; B60K 2370/1529; B60K 2370/176; B60R 1/00;
(Continued)

(56) References Cited

U.S. PATENT DOCUMENTS 8,712,103 B2 * 4/2014 Focke ....................... G06T 3/00
382/104
9,507,347 B1 * 11/2016 Ogale ................... H04N 5/2353
(Continued)

FOREIGN PATENT DOCUMENTS

CN 107554425 A * 1/2018
CN 108961790 A * 12/2018 ........... G08G 1/0116
(Continued)

OTHER PUBLICATIONS

European Search Report from the European Patent Office for related EP Application No. 18196064.2 dated Mar. 11, 2019, 8 pages.

*Primary Examiner* — Chico A Foxx
(74) *Attorney, Agent, or Firm* — Quinn IP Law (57) ABSTRACT

A system for providing traffic information to a driver of an ego vehicle includes at least one sensor that provides image data of detected objects, including other vehicles, in a surrounding area of the ego vehicle; a position detection device that detects a position of the ego vehicle; a display unit that renders visual information relating to an environmental model of the surrounding area of the ego vehicle, the position, and corresponding digital map data; and an image analysis unit configured to determine a vehicle characteristic of at least one other vehicle in the surrounding area of the ego vehicle from a vehicle image of the at least one other vehicle generated based on the image data from the at least one sensor and to display information on the display unit based on the determined vehicle characteristic.

20 Claims, 5 Drawing Sheets

(51) Int. Cl.
  *B60R 1/00* (2022.01)
  *B60K 35/00* (2006.01)
  *B60W 50/14* (2020.01)
  *B60W 40/04* (2006.01)
  *G06V 20/58* (2022.01)

(52) U.S. Cl.
  CPC ............. *B60W 50/14* (2013.01); *G06T 17/05* (2013.01); *B60K 2370/1529* (2019.05); *B60K 2370/176* (2019.05); *B60R 2300/307* (2013.01); *B60W 2050/146* (2013.01)

(58) Field of Classification Search
  CPC . B60R 2300/307; B60W 40/04; B60W 50/14; B60W 2050/146; G06T 17/05
  See application file for complete search history.

(56) References Cited

U.S. PATENT DOCUMENTS

| | | | |
|---|---|---|---|
| 11,062,167 B2 * | 7/2021 | Hotson | G01S 13/89 |
| 2007/0131755 A1 * | 6/2007 | Chang | G07C 5/085 |
| | | | 235/375 |
| 2008/0309762 A1 * | 12/2008 | Howard | G07C 5/0891 |
| | | | 348/148 |
| 2012/0087546 A1 * | 4/2012 | Focke | G06T 3/00 |
| | | | 382/104 |
| 2013/0076883 A1 * | 3/2013 | Madau | B60K 35/00 |
| | | | 348/78 |
| 2013/0097557 A1 * | 4/2013 | Madau | G02B 27/01 |
| | | | 715/810 |
| 2014/0176679 A1 * | 6/2014 | Lehning | G06V 20/54 |
| | | | 348/46 |
| 2017/0039435 A1 * | 2/2017 | Ogale | G06V 10/44 |
| 2017/0174261 A1 | 6/2017 | Micks et al. | |
| 2017/0307395 A1 * | 10/2017 | Kim | G01C 21/165 |
| 2018/0141492 A1 * | 5/2018 | Tokuda | H04B 10/1141 |
| 2018/0144202 A1 | 5/2018 | Moosaei et al. | |
| 2018/0362047 A1 * | 12/2018 | Hagawa | G06K 9/6288 |
| 2019/0111930 A1 * | 4/2019 | Katsura | B60W 30/18154 |
| 2020/0031278 A1 * | 1/2020 | Zafeirakis | B60Q 9/008 |

FOREIGN PATENT DOCUMENTS

| | | | |
|---|---|---|---|
| DE | 112016002233 T5 * | 2/2018 | ............... B60Q 1/00 |
| JP | 2004279362 A * | 10/2004 | |
| WO | 2011042876 A1 | 4/2011 | |
| WO | WO-2015159504 A1 * | 10/2015 | ........... B60C 11/005 |

* cited by examiner

DRIVER ASSISTANCE SYSTEM AND METHOD FOR DISPLAYING TRAFFIC INFORMATION

CROSS-REFERENCES TO RELATED APPLICATIONS

This patent application claims priority to European Patent Application Serial No. 18196064.2, filed Sep. 21, 2018, which is incorporated herein by reference in its entirety.

TECHNICAL FIELD

One or more embodiments described in the present application relate to a driver assistance system for providing traffic information to a driver of a vehicle and to a method for displaying traffic information to the driver of a vehicle.

In particular, one or more embodiments described herein relate to aspects of a system and a method configured for detection and recognition of objects in the surrounding area of a vehicle. Based on the result of detection and object recognition traffic information that may be relevant for guidance and safety aspects is concluded and output.

Embodiments of the system and the method described herein may be typically embodied by an advanced driver assistance system (ADAS).

BACKGROUND

In addition to conventional navigation systems, recently an increasing number of automotive vehicles have been equipped with advanced driver-assistance systems, also referred to as ADAS-systems. ADAS-systems are computer-based systems developed to automate, adapt, and enhance vehicle systems for increased safety and more comfortable driving. Features of an ADAS system may include, for example, electronic stability control, anti-lock brakes, lane departure warning, adaptive cruise control, and traction control.

ADAS related technology is based on inputs from multiple data sources, including cameras, LiDAR-sensor and radar sensors, image processing, computer vision, and in-car networking. Additional information may be provided from other sources separate from the primary vehicle platform (the "ego vehicle"), such as from other vehicles, referred to as Vehicle-to-vehicle (V2V)-communication, or Vehicle-to-Infrastructure communication, realized through mobile telephony or other wireless networks, like dedicated short-range communications (DSRC).

BRIEF SUMMARY

One or more embodiments relate to a driver assistance system for providing traffic information to a driver of a vehicle comprising at least one sensor for detecting objects, including other vehicles, in a surrounding area of the vehicle and for providing image data of the detected objects. A plurality of sensors may be provided, including, for example, a stereo camera, a radar sensor, a LiDAR sensor, and an inertial measurement unit (IMU).

According to this aspect, the sensor(s) may be mounted on board of the ego vehicle but embodiments are conceivable where the sensor is mounted to another vehicle and the respective sensor data is received by the ego vehicle by means of vehicle-to-vehicle (V2V) communication.

The sensor(s) may be configured to detect any object within a predetermined surrounding range of the ego vehicle, including other vehicles, or static objects, such as traffic lights, traffic indicators, trees, houses, et cetera.

According to a further aspect, the driver assistance system may comprise a digital map database providing road data, including a road network, and a position detection device for detecting a position of the vehicle on the road, such as a global navigation satellite system (GNSS).

Based on the detected position of the vehicle, the sensor data, and the digital map data, visual information relating to an environmental model of the area where the ego vehicle is currently located may be generated and provided on a display unit. The environmental model may be a simple two-dimensional illustration indicating graphically the current position of the vehicle on a road section as provided by the digital map data on the basis of the detected position of the vehicle. The environ-mental model may additionally present information regarding the surrounding of the vehicle, including the position of other vehicles, traffic indicators, bridges, trees and any object detected by the sensor in the surrounding area of the vehicle. Using more developed software tools, the environmental model may be displayed as 3D graphic to provide the driver with a realistic view not only from the windscreen of the driver's position in the cockpit of the vehicle but also with a top perspective from the entire surrounding area of the ego vehicle.

The sensor may be configured to continuously monitor the surrounding area of the vehicle, and a relating "logbook" of the surrounding area of the ego vehicle may be recorded on a relating storage medium in predetermined time periods, as the vehicle is continuously moving along a predetermined travelling route.

Furthermore, the driver assistance system may comprise an image analysis unit configured to determine a vehicle characteristic of at least one other vehicle in the surrounding area of the ego vehicle from a vehicle image of another vehicle, which has been detected by the sensor in the surrounding area of the ego vehicle. The term "vehicle characteristic" covers inherent permanent characteristics and properties of a vehicle as well as dynamically changing features like a condition or state of the vehicle or a component thereof. The "vehicle characteristic" may be directly apparent from the outer appearance of the vehicle or may be concluded from the outer appearance of the vehicle.

Based on the vehicle characteristic determined by the image analysis unit, a relating information may be output on the display unit, for example, or by means of an audio unit. Such information may include an alert if the occurrence of a dangerous situation is concluded by the system based on the determined characteristic of the vehicle and the traffic situation.

For example, the system may issue an alert in a situation where it is determined that a braked light of a vehicle in front of the ego vehicle is in an ON-state and that the distance of that vehicle in front to the ego vehicle is lower than predetermined threshold value. This example illustrates that a critical distance to another vehicle may be determined not only from a measured distance to the vehicle in front of the ego vehicle, but also from a characteristic determined by image analysis from the outer contour of the other vehicle, for example.

One or more embodiments of the driver assistance system include configurations of the image analysis unit to determine a vehicle characteristic relating to a current driving state of the other vehicle. Such a vehicle characteristic may, for example, be a brake light state and/or a turning light state and/or a driving light state of the other vehicle and/or a body-component state, such as tailgate that is open or closed, a trunk lid that is open or closed, a passenger door that is open or closed, a convertible top that is open or closed, a removable panel that is in place or removed, such as a removable roof panel.

As an example of such an embodiment, the driver of the vehicle may receive an alert if it is determined by the system that driving light of a vehicle in the surrounding area of the legal vehicle is not turned ON during night time.

According to a further aspect, the image analysis unit may be configured to determine from the sensor data a vehicle characteristic depending on a vehicle brand, a model type, and/or a color of the other vehicle by comparison with 3D model data stored in a vehicle model database, for example.

After a certain model of the vehicle has been identified by the system, a more realistic environment model may be depicted on the display, including a specific graphical representation of the related car model and color, for example. The rendering of graphical information about a certain vehicle model may also assist the driver's orientation and correlation of the perspective given by the environmental model in relation to his realistic view through the windscreen of the vehicle. Moreover, as a vehicle characteristic of the vehicle changes, e.g., activation of a brake light to deactivation of the brake light, the rendered image may change accordingly. Doing so improves the realistic view of the environmental model.

In addition, the model type and color information may be used for guidance purposes of a navigation system including a natural guidance concept in which the driver is prompted to follow a certain vehicle travelling in the same travelling path as the ego vehicle.

Further, the identification of a car model may be useful to provide safety relevant information. For example, once a certain car model has been identified, the accuracy of image analysis for determining, for example, whether a brake light is turned ON or OFF can be significantly increased because the exact shape and dimension of the brake light may be retrieved from model data stored in a vehicle model data storage device providing 3D data of car models and their components for all major car series. Based on the exact shape and dimension of the brake light of a given vehicle model, an exact shape of the distribution of the brake light in an ON condition may be modelled which may be used in image analysis of the outer contour of the other vehicle to determine whether a brake light is in fact turned ON or OFF.

Another safety relevant aspect that can be concluded from the model type identification is the determination of potential driving properties of a detected vehicle based on the identification of its model type. As an example for this aspect, it may be determined by the driver assistance system that a 30-year-old car model may have a braking system, which only allows for braking with a comparatively high braking delay. This determination may be considered safety-relevant information for other traffic participants in the vicinity of the 30-year-old vehicle.

One or more embodiments of the driver assistance system may comprise a receiving unit for receiving, from another vehicle, communication data relating to the vehicle characteristic of at least one of the other vehicles in the surrounding area of the ego vehicle. The communication data may include raw sensor data provided by another vehicle and/or a characteristic of the vehicle as determined by another system. In some embodiments, the ego vehicle may be informed by vehicle-to-vehicle communication about a specific brand, model type, or color of another vehicle in the surrounding area of the ego vehicle, for example.

The driver assistance system may be embodied by an ADAS system, wherein the sensor may be provided as a camera, a vision sensor, and/or a LiDAR sensor. For example, the car model identification can be carried out based on LiDAR point cloud describing the outer shape or contour of the vehicle, which may be utilized for classifying vehicle brands or identifying specific models. Additionally or alternatively, the sensor may detect and analyze textual indicia, which specifies a brand or model name, on the vehicle. Doing so may allow the ADAS system to identify the specific brand and model of the vehicle. Additionally or alternatively, the vehicle may provide a vehicle identification number or other identification information to the ego vehicle. The ego vehicle may utilize the vehicle identification number or other identification information to determine the brand, model, color, year, etc., of the vehicle.

In one or more embodiments, the display unit may comprise an instrument cluster or a head up display. Based on the model type determination, for example, a specific car model identified by the driver assist system can be displayed in the instrument cluster.

In one or more embodiments, the driver assistance system may be configured to continuously analyze sensor data relating to other vehicles in the surrounding area of the ego vehicle and to continuously determine one or more vehicle characteristic from the analyzed data and to store the determined vehicle characteristic together with time and/or location information. In such a manner, a kind of "blackbox" can be provided by the system, which allows for reconstruction of not only the travelling path of the ego vehicle but also to reconstruct the surrounding scenario of the vehicle at the time of travelling.

A broad variety of application scenarios may be conceived by combining different aspects described herein. For example, the above-described blackbox may be utilized in combination with the above described feature of vehicle model determination. Thereby it becomes possible to determine, for example, whether a specific vehicle encountered the ego vehicle along its travelling path, which may be helpful for identifying vehicles, which are subject of a national or international search, for example.

The range of available application scenarios of the system described herein is even increased by embodiments in which the driver assistance system and the image analysis unit are configured to detect a static object in the surrounding area of the ego vehicle and to analyze the condition state of that static. This does not only include the detection of constructive obstacles and the like, but may also include dynamically changing object features, like the ON/OFF-state of a traffic light in the surrounding area of the ego vehicle, for example, which may be detected as an object and subsequent image analysis sensor data to reveal its condition state. For example, the traffic light may dynamically change from a red-light state to a green-light state. In an example where the static object is rendered as an image in the environmental model, such as a 3-D image, the rendered image may be updated based on changes to the dynamic features. For example, in the case of the traffic light changing from the red-light state to the green-light state, the rendered image may be updated accordingly. Doing so improves the realistic view of the environmental model.

As an example for such an embodiment, a driver assistance system may be configured to analyze a relationship between a detected position of another vehicle and a detected brake light state of the other vehicle or the relationship between a detected position of the ego vehicle and a detected state of a traffic light and to output an information relating to the result of the analysis of this relationship to the driver.

In some embodiments, the step of detecting a state/condition of a static object in the surrounding area of the ego vehicle may be carried out in addition to determining the vehicle characteristic of a vehicle in the surrounding area of the ego vehicle, while in other embodiments this step may be carried out instead of the step of determining the vehicle characteristic of the vehicle in the surrounding area of the ego vehicle. As such, one or more embodiments may analyze objects other than vehicles surrounding the ego vehicle. For example, the objects may include traffic signs and traffic indicators, and the object may be detected and analyzed regarding their condition states through image data provided by sensor(s) monitoring the surrounding area of the ego vehicle.

According to another aspect, one or more embodiments provide a method for displaying traffic information to a driver of a vehicle, comprising the steps of providing image data of at least one other vehicle in the surrounding area of the ego vehicle, analyzing the received image data, determining a vehicle characteristic from the result of the analysis, and displaying information relating to the determined vehicle characteristic.

In one or more embodiments the step of analyzing the received image data may be carried out using a neural network to classify objects within a given image space. For example, the method may include applying a neural network onto an image generated on the basis of the image data obtained from the sensor, and analyzing an image content within a limited area defined by a bounding box inside the image. A model database comprising 3D data of various vehicle series may be utilized to train a neural network to detect models and/or subclasses of cars corresponding to brand names.

In alternative embodiments, image analysis may be carried out by evaluating pixels inside a bounding box comprising the detected object of interest. One or more embodiments of the method comprise the steps of determining a position of the ego vehicle and/or another vehicle and determining a vehicle characteristic relating to the driving state of the other vehicle, such an embodiment may comprise the additional steps of determining guidance or safety information based on the determined vehicle characteristic and the position of the other vehicle and/or the position of the ego vehicle and outputting the determined guidance of safety information to the driver of the ego vehicle. The safety information may comprise an alert in cases where, for example, a braking process of a vehicle in front of the ego vehicle is ongoing as detected from the vehicle's brake light state, while the guidance information may be to follow a certain car model identified in the surrounding area of the ego vehicle, for example. The guidance information may be a combination of an audible instruction, such as through sound system in the ego vehicle, along with a 3D rendered image on the display unit, which may include a vehicle characteristic, of the car model identified in the surrounding area. Doing so may allow the driver to better understand the guidance information. As an example, the rendered image may improve the driver's confidence in his understanding of the guidance information. If the driver did not hear or did not understand the audible instruction, the driver may still comprehend the guidance information based on the rendered image. If the driver is uncertain about audible instruction, such as in a case where the driver is unfamiliar with model names and/or if there are similarly colored vehicles, the driver may use the rendered image to improve his understanding. For example, if the audible instruction is to follow the yellow vehicle, and there are multiple yellow vehicles, differing in model type or vehicle characteristic, to choose from, then the driver may look to the rendered image to determine which one is the target vehicle to follow. This may be further enhanced when the rendered image is spatially arranged in the environmental model.

One or more embodiments further comprise the step of providing image data of a static object within a predefined surrounding range of the ego vehicle, analyzing the provided data and outputting safety or guidance information to the driver of the ego vehicle based on the result of the analysis of provided image data and the position of the ego vehicle and/or the position of the other vehicle.

Examples for such embodiments include the determination of a meaning of a traffic sign or a traffic indicator identified in the surrounding area of the vehicle and outputting an alert to the driver, and, if useful, a driving instruction to avoid occurrence of a critical traffic situation, in cases where the system determines that the driving condition of the ego vehicle is not in accordance with the meaning of the traffic sign or the traffic indicator, for example.

BRIEF DESCRIPTION OF THE DRAWINGS

FIG. 5 A/B illustrates an example for car recognition using an embodiment of a driver assist system and a method for displaying traffic information to a driver of a vehicle.

DETAILED DESCRIPTION

Figure 1:
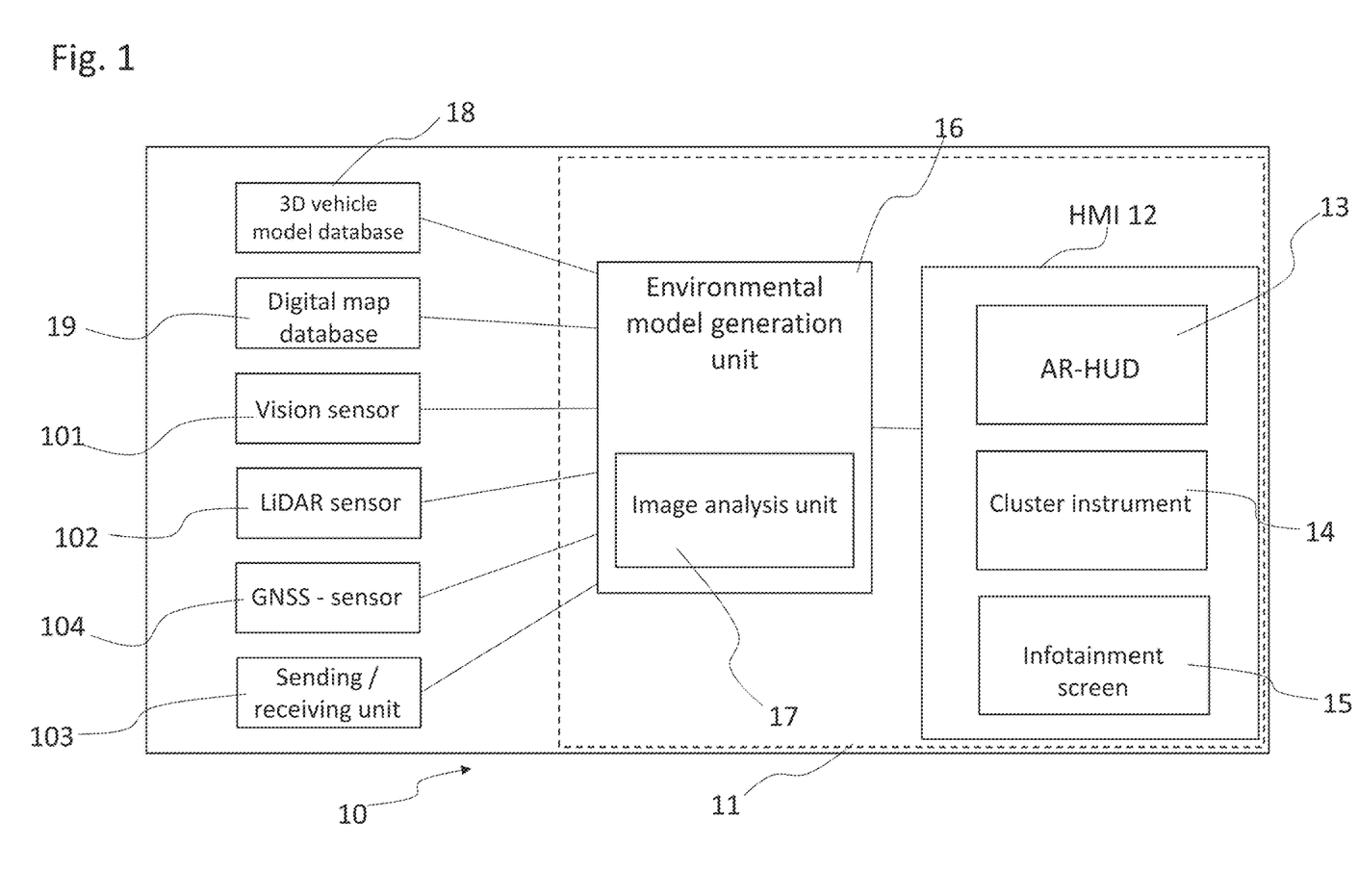
FIG. 1 schematically illustrates a driver assist system according to an embodiment.

FIG. 1 shows a schematic illustration of the driver assist system according to an embodiment. In the present embodiment, the driver assist system 10 is embodied as ADAS system 11 having a human machine interface (HMI) 12 comprising an augmented reality head-up display (AR-HUD) 13, a cluster instrument 14 and an infotainment screen 15.

Furthermore, the ADAS system 11 comprises an environmental model generation unit 16 and an image analysis unit 17 configured to determine a vehicle characteristic from an image displayed on AR-HUD 13, the cluster device 14 or an infotainment screen 15. In this embodiment, the image analysis unit 17 is configured to automatically analyze images of the environmental model rendered on one or more of the display devices 13-15, for example, every 50 ms. In alternative embodiments, an interactive menu with relating guidance may be provided to allow the driver to select an object from a displayed image for image analysis for determining a relevant characteristic.

In the present embodiment, the driver assist system 10 additionally comprises a vehicle model database 18 for storing vehicle model type data of vehicle series of various brands and model types and a digital map database 19 for storing digital road map data. The data provided by the vehicle model database 18 and the digital map database 19 is used by the environmental model generation unit 16 to display an environmental model of the traffic situation within a predetermined distance around the ego vehicle depending on the sensor range and is additionally used by the image analysis unit for identifying a vehicle characteristic. In the present embodiment, after identification of a certain model type of a car in the area surrounding the ego vehicle, a corresponding graphical representation of the respective car model is included in the generated environmental model displayed on one or more of the display devices 13-15.

The driver assist system 10 further comprises a vision sensor 101 and a LiDAR sensor 102 for providing image data of an object detected in an area surrounding the ego vehicle, a sending and receiving unit 103 for receiving image data or a vehicle characteristic data from another vehicle by means of V2V-communication, and a GNSS sensor 104 for detecting the current position of the vehicle.

Figure 2:
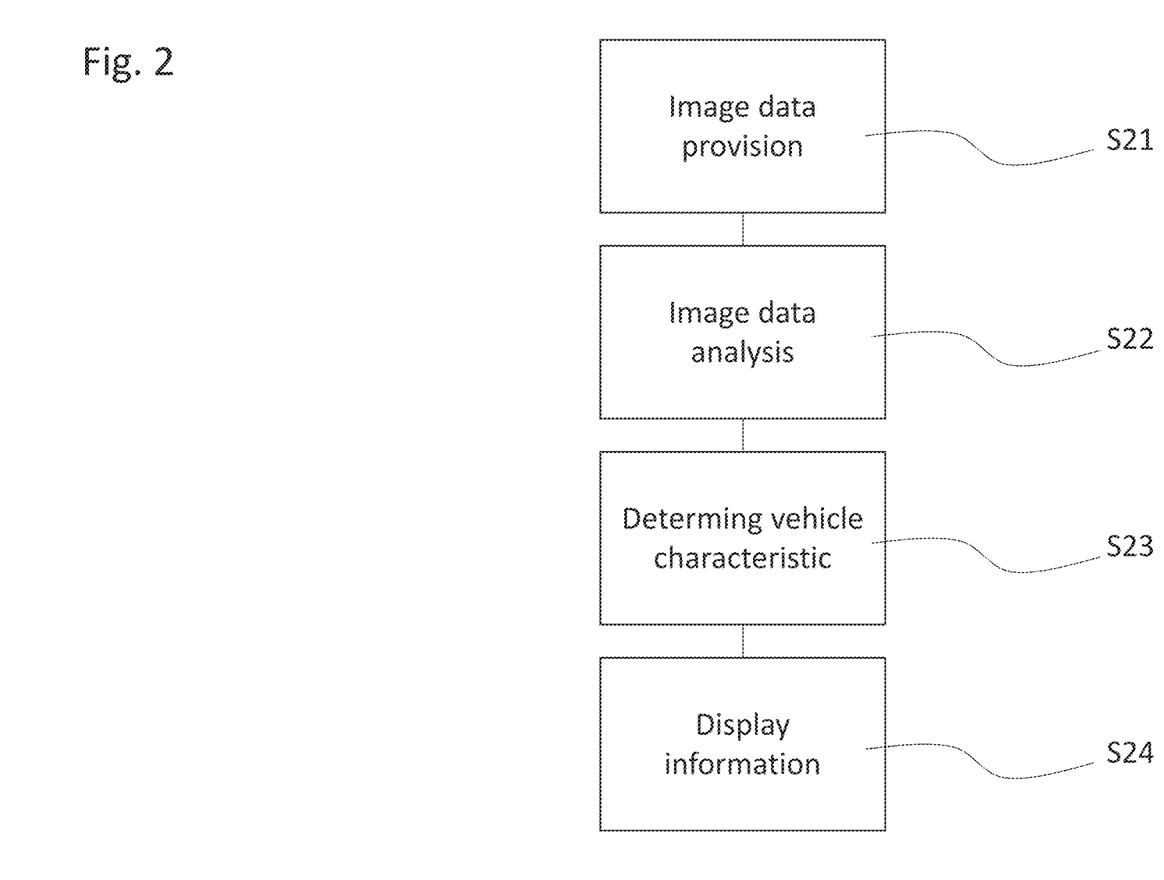
FIG. 2 shows a process flow schematically illustrating an embodiment of a method for displaying traffic information to a driver of a vehicle.

A process flow schematically illustrating an embodiment of a method for displaying traffic information to a driver of a vehicle is depicted in FIG. 2. The method for displaying traffic information to a driver of a vehicle comprises the steps of providing image data of at least one other vehicle in the surrounding area of the ego vehicle (step S21), analyzing the received image data (step S22), determining a vehicle characteristic from the result of the analysis (step S23), and displaying information relating to the determined vehicle characteristic (step S24). The step of providing image data of another vehicle in the surrounding area of the ego vehicle may be replaced in cases where a specific vehicle characteristic data is received from an external station or by V2V communication from another traffic participant. It is also conceivable that image data is received from another vehicle or an external station, which is then processed by the driver assist system, provided in the ego vehicle.

Figure 3:
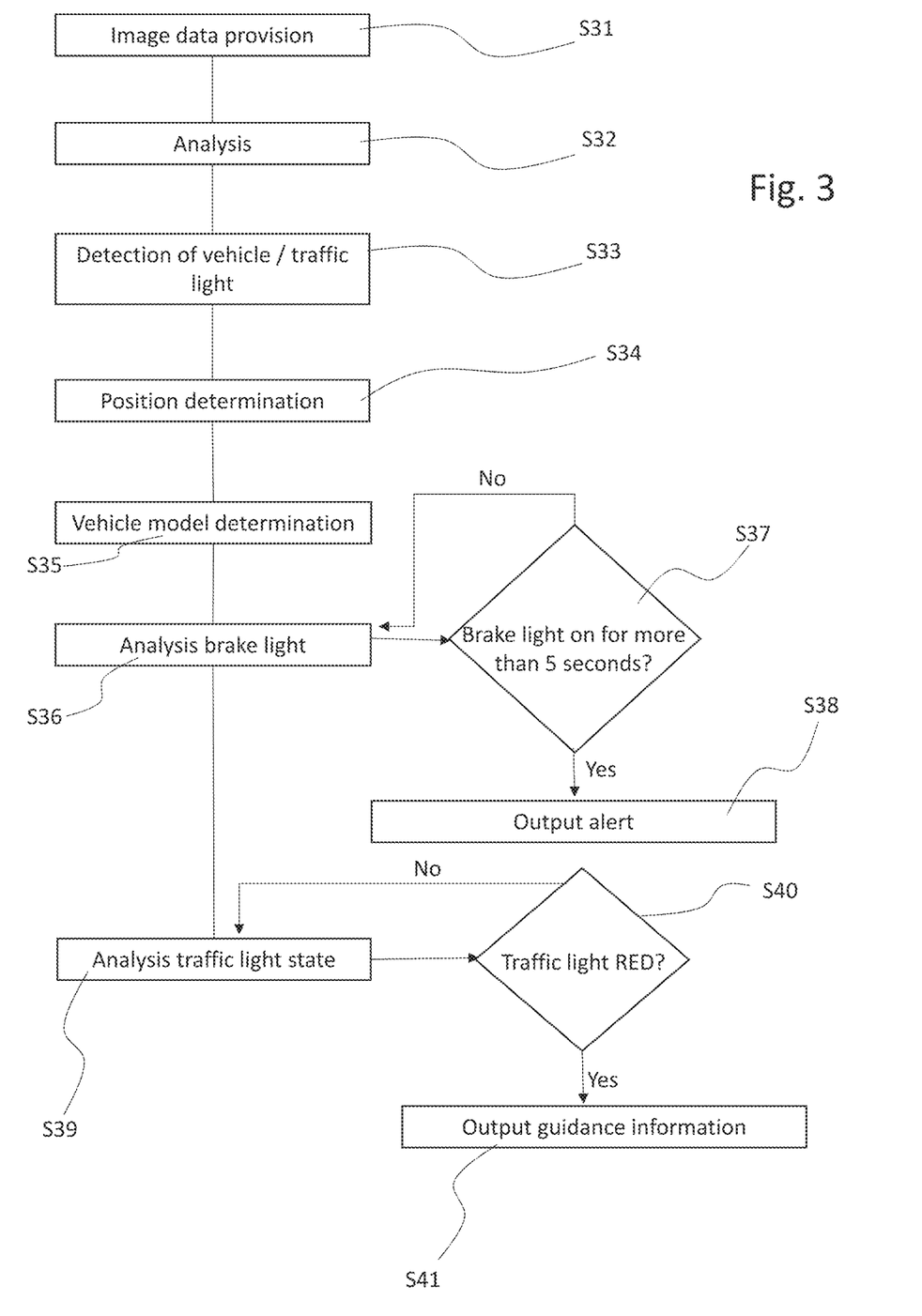
FIG. 3 shows a process flow schematically illustrating another embodiment of a method for displaying traffic information to a driver of a vehicle.

A further embodiment of a method for displaying traffic information to a driver of a vehicle is depicted in FIG. 3. In this embodiment, the driver assist system is configured to not only detect and analyze image data of vehicles surrounding the ego vehicle, but in addition to detect and analyze image data of other objects in the environment of the ego vehicle which may possibly influence the driving behavior of the driver and the vehicle's trajectory. For example, in the present embodiment, the state of a traffic light is determined by image analysis and object recognition of the traffic light, followed by analysis of the ON/OFF-state of the traffic light. Based on the result of the analysis, driving instruction is output by the driver assist system.

In step S31, image data of the surrounding of the vehicle is provided by a front camera mounted in the area below the windshield of the vehicle, for example. In step S32, the image data is continuously analyzed using a convolutional neural network, which has been trained to detect vehicles and traffic indicators. In step S33, a vehicle and a traffic sign are identified to be located on the road in front of the ego vehicle on the driving route of the ego vehicle.

In step S34, the position of the ego vehicle is detected by a GNSS sensor and based on the detection of the position of the ego vehicle and the camera image, the position of the traffic sign and of the other car in front of the ego vehicle are determined.

In step S35, the outer contour of the car image is compared to model data retrieved from a vehicle model database to determine the vehicle model of the other car driving in front of the ego vehicle. In step S36, based on the determination of the vehicle model in step S35, the shape of brake light of the respective car model, in the present embodiment a BMW 320 model which has been identified as a car driving in front of the ego vehicle, is retrieved from the database and compared to the camera image to determine whether or not the brake light is set ON.

In step S37, it is continuously analyzed whether or not the brake light of the other car is turned ON for more than 5 seconds. If it is confirmed in step S37, that the brake light is in the ON-state for more than 5 seconds, an alert is issued graphically on the display unit of the driver assist system, "Attention vehicle in front is decelerating or standing still," in step S38. This way, a driver of the vehicle may be informed of a potential obstacle on his driving route even if the minimum distance to the potential obstacle at which a warning is conventionally output by the system due to an approaching obstacle has not yet been undershot.

In step S39, the condition state of the traffic light detected in step S33 is analyzed and, if it is determined that the traffic light is in an ON-state in step 40, an information is output to the driver in step S41, "Attention, traffic light 300 m in front is RED." This way, the driver is informed and may, therefore, take action like decelerating the vehicle or setting the gear mechanism to a neutral position for reduction fuel consumption even if the traffic light is still remote with such a distance that braking has not yet become necessary.

While in the present embodiment alert messages and guidance indications have been output irrespectively of the distance to the detected objects, such messages may be output based on predefined conditions taking into account not only the detected state/condition of the brake light or of a traffic sign, for example, but also under consideration of the distance of the vehicle to the detected object e.g. the other car in front of the ego vehicle or the traffic sign. In such a manner, a more sophisticated guidance information can be determined and output to the driver based on the concept of object recognition and analysis in the surrounding area of the ego vehicle.

Figure 4:
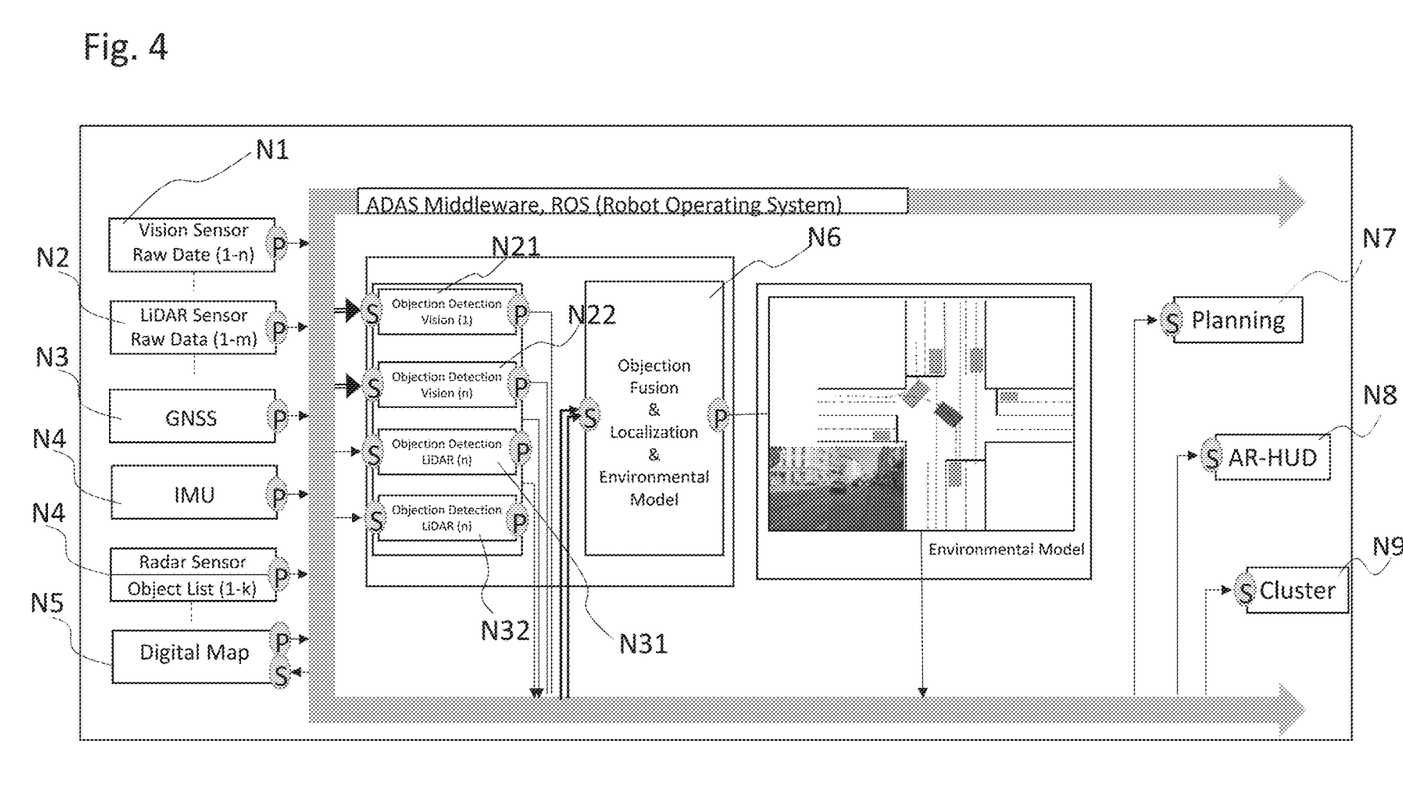
FIG. 4 shows schematically an example of the information flow for generating an environmental model by an embodiment of the driver assist system and an embodiment of a method for displaying traffic information to a driver of a vehicle.

FIG. 4 shows schematically an example of the information flow realized by a software platform for generating an environmental model by an embodiment of the driver assist system and an embodiment of a method for displaying traffic information to a driver of a vehicle. Specifically, in this embodiment the ADAS middleware layer is realized by means of a Robert Operating System (ROS) software framework. Within the ROS software framework, different nodes are provided as executables, being subject to subscribe (s) or publish (p). For example, the process of collecting raw data of a vision sensor N1, raw data of a LiDAR sensor N2, GNSS-based position detection N3, the provision of an object list by a radar sensor N4, and the provision of a digital map data N5 each constitute (executable) nodes under the ROS framework. The same holds true for the relating object detection based on the respective data provided by the vision sensor and the LiDAR sensor, respectively, nodes N21, N22, N31, and N32.

The fusion of data of the detected objects together with localization data as determined by the GNSS and road map data from the digital map, node N6, results in an environmental model of the surrounding of the ego vehicle. Components or parts or the entire environmental model may be displayed on an AR-HUD N7 or an instrument cluster N8 or may be utilized for planning purposes N9 such as navigation applications and the like.

Figure 5A:
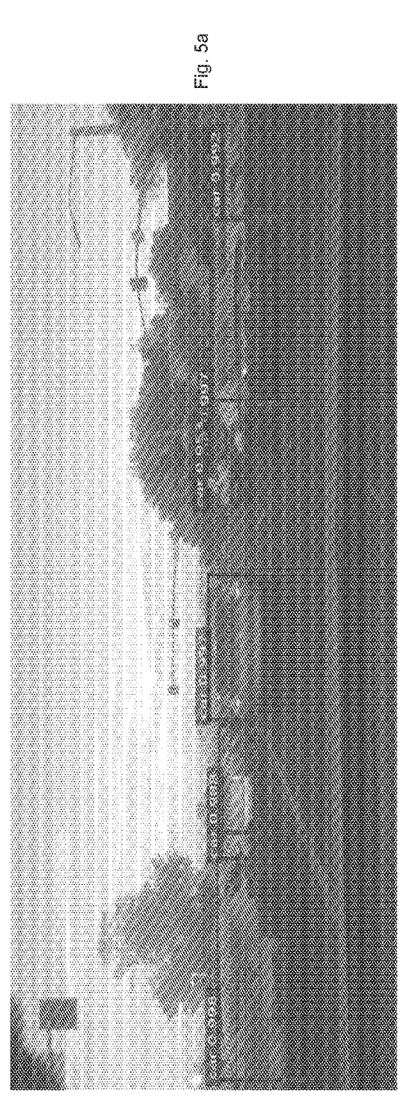
Figure 5B:
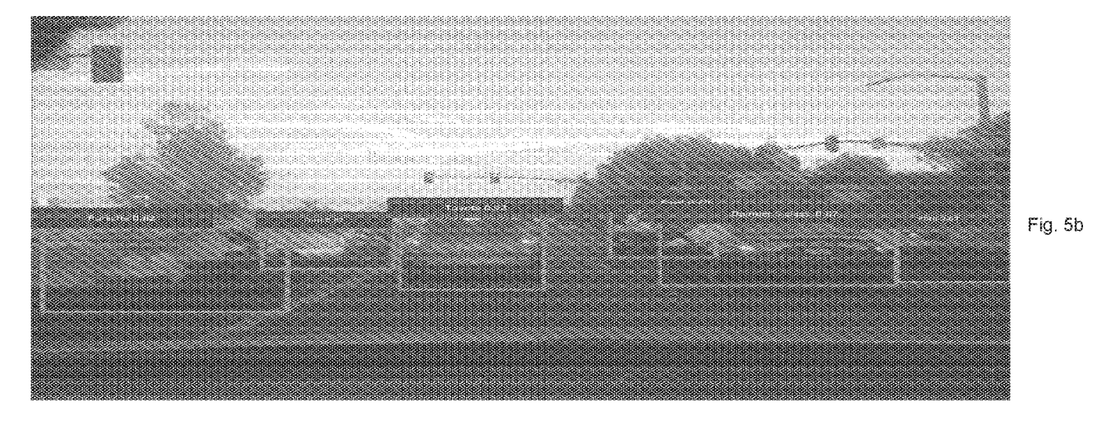

In FIG. 5 A/B, an example for car model recognition is illustrated. As shown in FIG. 5A, in a first step an image from the perspective of the driver as taken by a stereo camera is analyzed using a convolutional neural network to detect the presence of other cars in front of the ego vehicle. In a second step illustrated in FIG. 5B, the model type of the vehicle is analyzed and determined by comparison of the outer circumference of the car shape with 3D car model data stored in the vehicle data storage.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A driver assistance system for providing traffic information to a driver of an ego vehicle, the driver assistance system comprising:
    at least one sensor that provides image data of detected objects, including other vehicles, in a surrounding area of the ego vehicle;
    a position detection device that detects a position of the ego vehicle on a road;
    a display unit that renders visual information relating to an environmental model of the surrounding area of the ego vehicle based on at least the image data and the detected position; and
    an image analysis unit configured to:
        determine a brake light of an other vehicle in the surrounding area of the ego vehicle to be one of on and off as function of a comparison of a vehicle image of the other vehicle with a brake light rendering of the brake light, the image analysis unit determining the vehicle image from the image data and retrieving the brake light rendering from a model data stored in a vehicle model database; and
        display information on the display unit indicating the brake light to be on when the comparison indicates the brake light to be on and to be off when the comparison indicates the brake light to be off.

2. The driver assistance system of claim 1, wherein the image analysis unit is further configured to determine a vehicle characteristic relating to a current driving state of the other vehicle.

3. The driver assistance system of claim 1, wherein the image analysis unit is further configured to determine, from the image data, the model data based on at least one of a vehicle brand, a model type, and a color of the other vehicle.

4. The driver assistance system of claim 1, wherein the at least one sensor includes a camera.

5. The driver assistance system of claim 1, wherein the at least one sensor includes a vision sensor.

6. The driver assistance system of claim 1, wherein the at least one sensor includes a LiDAR sensor.

7. The driver assistance system of claim 1, wherein the image analysis unit is further configured to detect a state of a traffic light in the surrounding area of the ego vehicle.

8. The driver assistance system of claim 1, wherein the model data includes a specific representation of the other vehicle, the specific representation including the brake light rendering.

9. The driver assistance system of claim 8, wherein the specific representation includes a three-dimensional rendering of the brake light.

10. The driver assistance system of claim 8, wherein the specific representation includes an exact shape and dimension of the brake light.

11. The driver assistance system of claim 10 wherein the image analysis unit is configured to:
   determine a turning light of the other vehicle to be one of on and off as function of a turning comparison of the vehicle image with a turning light rendering, the turning light rendering including an exact shape and dimension of the turning light and included as part of the model data; and
   display information on the display unit indicating the turning light to be on when the turning comparison indicates the turning light to be on and to be off when the turning comparison indicates the turning light to be off.

12. The driver assistance system of claim 10 wherein the image analysis unit generates the display information to include an alert indicating the other vehicle in front is decelerating or standing still.

13. The driver assistance system of claim 12 wherein the image analysis unit generates the alert in response to the brake light being determined to be continuously on for at least predetermined period of time.

14. A method for providing traffic information to a driver of an ego vehicle, the method comprising:
   detecting objects, including an other vehicle, in a surrounding area of the vehicle;
   providing image data of the detected objects;
   detecting a position of the ego vehicle on a road;
   rendering visual information relating to an environmental model of the surrounding area of the ego vehicle based on the image data, the detected position, and corresponding digital map data;
   generating a vehicle image of the other vehicle based on the image data;
   determining a brake light of the other vehicle to be one of on and off based on a comparison of the vehicle image with a brake light rendering of the brake light; and
   displaying information on a display of the ego vehicle indicating the brake light to be on when the comparison indicates the brake light to be on and to be off when the comparison indicates the brake light to be off.

15. The method of claim 14 further comprising executing vehicle-to-vehicle communication between the ego vehicle and the other vehicle to determine a brand and a model type for the other vehicle.

16. The method of claim 15 further comprising retrieving, using the brand and the model type, the brake light rendering from a model data stored for the other vehicle in a vehicle model database.

17. The method of claim 16 further comprising generating the information on the display to include a graphical representation of an exact shape and dimension of the brake light.

18. The method of claim 17 further comprising illuminating the graphical representation when the brake light is determined to be on and de-illuminating the graphical representation when the brake light is determined to be off.

19. The method of claim 18 further comprising generating the display information to include an alert indicating the other vehicle in front is decelerating or standing still in response to the brake light being determined to be continuously on for at least predetermined period of time.

20. An apparatus for providing traffic information to a driver of an ego vehicle, the apparatus comprising:
   a processor; and
   a memory that includes instructions that, when executed by the processor, cause the processor to:
      detect another vehicle in a surrounding area of the ego vehicle;
      provide image data of the another vehicle;
      detect a position of the ego vehicle on a road;
      render visual information relating to an environmental model of the surrounding area of the ego vehicle based on at least the image data and the detected position;
      generate a vehicle image of the another vehicle based on the image data;
      identify a model type for the another vehicle from the vehicle image or from vehicle-to-vehicle communication with the another vehicle;
      retrieve, using the model type, a model data stored for the another vehicle in a vehicle model database, the model data including a turning light rendering having an exact shape and dimension of a turning light included on the another vehicle;
      determine the turning light to be one of on and off based on a comparison of the vehicle image to the turning light rendering; and
      display information on a display of the ego vehicle indicating the turning light to be on when the comparison indicates the turning light to be on and to be off when the comparison indicates the turning light to be off.

* * * * *